(12) United States Patent
Shapin et al.

(10) Patent No.: US 11,245,492 B2
(45) Date of Patent: Feb. 8, 2022

(54) DETECTION OF INCONSISTENT DATA IN A DATA TRANSMISSION

(71) Applicant: Telefonaktiebolaget LM Ericsson (publ), Stockholm (SE)

(72) Inventors: Alexey Shapin, Luleå (SE); Niklas Andgart, Södra Sandby (SE); Kittipong Kittichokechai, Järfälla (SE); Mårten Sundberg, Årsta (SE); Gustav Wikström, Täby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/338,826

(22) PCT Filed: Mar. 23, 2018

(86) PCT No.: PCT/EP2018/057542
§ 371 (c)(1),
(2) Date: Apr. 2, 2019

(87) PCT Pub. No.: WO2018/172552
PCT Pub. Date: Sep. 27, 2018

(65) Prior Publication Data
US 2020/0052810 A1    Feb. 13, 2020

Related U.S. Application Data (60) Provisional application No. 62/476,658, filed on Mar. 24, 2017.

(51) Int. Cl.
*H04L 1/00* (2006.01)
*H04L 1/18* (2006.01)

(52) U.S. Cl.
CPC ............ *H04L 1/005* (2013.01); *H04L 1/0003* (2013.01); *H04L 1/1832* (2013.01); *H04L 1/1845* (2013.01)

(58) Field of Classification Search
CPC ...................................................... H04L 1/005
See application file for complete search history.

(56) References Cited

U.S. PATENT DOCUMENTS 6,400,928 B1   6/2002 Khullar et al.
7,313,204 B2  12/2007 Yang
(Continued)

FOREIGN PATENT DOCUMENTS

CN   102714638 A   10/2012
CN   104365050 A    2/2015
(Continued)

OTHER PUBLICATIONS

Deng, M. et al., "An Improved Blind Modulation Detection Method for Adaptive OFDM Systems", 2006 8th International Conference on Signal Processing, Nov. 16-20, 2006, pp. 1-4, Beijing, China.
Ericsson, et al., "New Work item on Highly Reliable Low Latency Communication for LTE", 3GPP TSG RAN Meeting #75, Dubrovnik, Croatia, Mar. 6-9, 2017, RP-170119.
(Continued)

*Primary Examiner* — John D Blanton
(74) *Attorney, Agent, or Firm* — Coats & Bennett, PLLC (57) ABSTRACT

The present disclosure provides methods and apparatus for detecting when a data transmission has been preempted or punctured by detecting inconsistency in the modulation or other signal characteristic of a received signal. If an inconsistency is detected, measures can be taken to mitigate potential problems caused by the inconsistent data. In one example, the receiving device (30) may identify soft bits in a soft buffer that may have been corrupted and flush the corrupted parts from the soft buffer.

26 Claims, 8 Drawing Sheets

(56) References Cited

U.S. PATENT DOCUMENTS

| | | | |
|---|---|---|---|
| 8,230,310 | B2 | 7/2012 | Rosenqvist |
| 9,432,166 | B2 | 8/2016 | Wang et al. |
| 10,958,321 | B2 | 3/2021 | Park et al. |
| 2008/0120529 | A1 | 5/2008 | Sugiura et al. |
| 2009/0044082 | A1* | 2/2009 | Landau ............. H03M 13/6306 714/790 |
| 2010/0309861 | A1* | 12/2010 | Gorokhov ............ H04B 1/7103 370/329 |
| 2012/0281638 | A1* | 11/2012 | Ly-Gagnon ........... H04W 8/005 370/329 |
| 2013/0084810 | A1* | 4/2013 | Matsubara ........... H04B 1/1036 455/73 |
| 2013/0297996 | A1 | 11/2013 | Wilborn et al. |
| 2015/0098432 | A1 | 4/2015 | Han et al. |
| 2017/0068506 | A1* | 3/2017 | Mamola .................. G06F 3/165 |
| 2017/0331662 | A1* | 11/2017 | Sun ..................... H04L 27/3411 |

FOREIGN PATENT DOCUMENTS

| | | |
|---|---|---|
| EP | 0984595 B1 | 4/2007 |
| EP | 2723012 B1 | 4/2014 |
| JP | 2014241597 A | 12/2014 |
| JP | 2020509677 A | 3/2020 |
| WO | 2018143848 A1 | 9/2018 |
| WO | 2018182381 A8 | 9/2019 |

OTHER PUBLICATIONS

Oualcomm Incorporated, "Performance requirements for MUST", 3GPP TSG-RAN WG4 #82, Athens, Greece, Feb. 13-17, 2017, R4-1700509.
PCT/KR2018/003855, LG Electronics Inc., "Method for Transmitting Uplink Data in Wireless Communication System and Apparatus Therefor", filed Apr. 2, 2018.

\* cited by examiner

DETECTION OF INCONSISTENT DATA IN A DATA TRANSMISSION

TECHNICAL FIELD

The present invention relates generally to puncturing of data transmission to enable data insertions and, more particularly, to a method implemented by a receiving device for detecting when a data transmission has been punctured.

BACKGROUND

In many wireless communications systems HARQ (Hybrid Automatic Repeat Request) retransmission is a method used to mitigate unpredictable interference and channel variations. When a wireless device attempts to decode a data message received on the downlink, it transmits an indicator to the transmitter indicating whether the decoding was successful. When the transmitter receives an indicator indicating unsuccessful decoding, the transmitter typically performs a retransmission of the data message, which the receiver typically will combine with the original received transmission. The combining is known as soft combining of which Chase combining and incremental redundancy combining are two well-known variants. Chase combining denotes sending the same redundancy version (i.e., same set of soft values) in the initial transmission and in the retransmission. Incremental redundancy denotes sending a different set of soft values in the retransmission. This set can be partly overlapping with the first, or completely complementary. The soft combining manipulates estimated bit qualities. Usually bit quality is expressed as a log-likelihood ratio (LLR) that indicates how reliable each bit is. The combining increases the probability of successful decoding.

At the physical layer, each transmission comprises a sequence of modulation symbols. Each modulation symbol is a signal with defined characteristics such as phase and magnitude. At the transmitter, a set of information bits are mapped to modulation symbols. The reverse process at the receiver of mapping modulation symbols to estimated bit qualities (LLRs) is referred to as de-mapping or demodulation. Currently in different standards the following mapping/de-mapping or modulation/demodulation schemes are used: Binary phase-shift keying (BPSK), Quadrature Phase Shift Keying (QPSK), Quadrature Amplitude Modulation (QAM). QAM may comprise 16 QAM, 64 QAM and 256 QAM. Other modulation schemes can also be used.

URLLC (Ultra-Reliable Low Latency Communication) is a data service with extremely strict error and latency requirements. Error probabilities as low as $10^{-5}$ or lower and 1 ms end-to-end latency or lower are expected requirements.

The Third Generation Partnership Project (3GGP) is currently developing standards for 5th Generation (5G) networks targeting a wide range of data services, including Mobile Broadband (MBB) and URLLC. To enable optimized services, the length of the Transmission Time Interval (TTI) is expected to be different for different services, where URLLC may have a shorter TTI length compared to MBB to minimize latency. It is possible that a MBB block is transmitted at the time when a URLLC data packet arrives at the transmitter. It may therefore be desirable to blank (interrupt) the MBB transmission in certain time-frequency resources and perform a URLLC transmission on those resources. The drawback with this approach is that the wireless device receiving the partial MBB will, with high probability, fail to decode it properly because the receiver will not be able to detect that the URLLC data does not belong to the MBB data transmission, and hence it will corrupt the decoding. This problem may be solved by performing HARQ retransmissions, but because the soft buffer is partly corrupt (for the resource where the first transmission was blanked), a larger number of HARQ retransmissions may be required to correctly decode the interrupted signal. If the wireless device was aware of the resource blanked by the transmitter, the inserted bits could be discarded in the decoding process (since they are known not to belong to the MBB transmission).

In Long Term Evolution (LTE) there is already a mechanism that can be used to solve the decoding problem. In LTE, a new transmission is indicated to the wireless receiver device by toggling a 1-bit New Data Indicator (NDI) flag. That is, the value of the NDI flag is changed every time new data is transmitted. A change of the NDI flag indicates to the wireless receiver that it should reset or flush the soft buffer so that it does not attempt to combine old data with new data.

During a MBB data transmission, for example, URLLC data might arrive and need to be transmitted immediately. Therefore, the MBB signal may be punctured and the URLLC data may be inserted into the MBB data transmission. Puncturing (or another term is preempting) helps to transmit the URLLC data together with MBB data without additional delay and it allows the URLLC data to replace part of the already scheduled MBB data.

The outlined problem that a MBB transmission is partly blanked, which will partly corrupt the soft buffer, may be solved by means of a retransmission of the data with an indication that the transmission is a new transmission. The wireless device will then flush the corrupted part of its soft buffer and will hence not combine the corrupted data. The drawback is that data which was not punctured in the first transmission can no longer be combined with the re-transmitted data.

Another solution is to explicitly indicate what part of the first transmission was blanked. For example, if the MBB transmission is divided into X slots in time and Y slots in frequency, the MBB transmission may be divided into X*Y code blocks where each code block is protected by a Cyclic Redundancy Check (CRC). The wireless device may then divide the soft-buffer into X*Y soft-buffers for each of the code blocks. If the URLLC transmission is punctured in one of the slots, the transmitter may indicate in the assignment of the retransmission which of the soft buffers needs to be flushed. This approach requires several bits to indicate which one of soft buffers was affected by the puncturing and causes additional control signaling overhead. Further, this approach doesn't guarantee a puncturing detection with acceptable probability.

SUMMARY

The present disclosure provides methods and apparatus for detecting when a data transmission has been preempted or punctured by detecting inconsistencies in the modulation or other characteristics of a received signal. If an inconsistency is detected, measures can be taken to mitigate potential problems caused by the inconsistent data, such as combining the wrong data. In one example, the receiving device may identify soft bits in a soft buffer that may have been corrupted and flush the corrupted parts from the soft buffer.

In one embodiment, the detection is performed by identifying variations of the signal characteristics of the received data, including for example variations in modulation order and/or allocated power. The receiving device, which may be a base station or a user equipment (UE) can have been assigned part of these signal characteristics by the network, for example the modulation order. In one embodiment the detection process includes searching for deviations in the known signal characteristics, such as the modulation order. In another embodiment, relative variations in unknown signal characteristics, such as power level, is used for detection with the assumption that the unknown signal characteristics are not varying over at least a known subset of the resource allocation for the data transmission. For example, it may be assumed that the power is the same over the full block, or at least a known subset of the block. In one embodiment the receiving device monitors a variance in the log-likelihood ratio (LLR) modulus (i.e., absolute value of the LLR) within a sliding window during detection process to detect the inconsistent data. The sliding window size may be based on a minimum possible size of a corrupted region in one Orthogonal Frequency Division Multiplexing (OFDM) symbol. An estimation of the LLRs may be done by a supported bank of de-mappers/demodulators. If part of the received signal was replaced by another signal with different characteristics, the variance of LLRs modulus within the sliding window will be deviating from expected value where data has been replaced. A dynamic detection threshold is introduced for enhancing the detection algorithm. A technical effect of these embodiments is that a data inconsistency can be detected in a more effective and specific manner. This provides the advantage that explicit signaling can be avoided and enables adaptive means to be applied depending on the type and extent of the inconsistency. Whenever an inconsistency is detected, the extremums of the variance of LLRs modulus are used for localization of the corrupted region. The LLRs of detected corrupted bits may be set to the most neutral value (e.g. "0"), or could be marked by any other technique for further decoding process.

One aspect of the disclosure comprise methods implemented by a receiving device in a wireless communication network (e.g., user equipment (UE) or base station) of receiving downlink control information. In one embodiment, the receiving device receives a data signal from a transmitting device and demodulates the data signal to generate soft bit values. The receiving device further computes detection metrics for two or more subsets of the soft bit values, and detects inconsistent data in at least one subset of the soft bit values based on the detection metrics corresponding to the at least one subset. If an inconsistency or data corruption is detected, problems caused by the inconsistent data, such as combining the wrong data in the decoder, can be avoided to improve decoding performance and reduce the number of retransmissions, which in turn will improve spectral efficiency and system capacity.

Another aspect of the disclosure is the use of a sliding window detector to search for known deviations from expected values in signal characteristics, such as the modulation order or power level, to detect the inconsistent data. The sliding window detector provides an efficient mechanism to detect the inconsistent data.

Another aspect of the method is the use of a dynamic threshold to enable the detection of the inconsistent data. The dynamic thresholds can be computed based on a statistical property of the received data signal, such as the variance. Upper and lower thresholds can be used to detect both maximas and minimas. The use of dynamic thresholds in both directions compensates for drifting effects to allow more reliable detection of the inconsistent data. Another aspect of the disclosure comprises a receiving device configured to detect insertion of inconsistent data in a received data signal. The receiving is configured to perform the method described in the preceding paragraph.

In one embodiment, the receiving device comprises a receiving circuit configured to receive a data signal from a transmitting device, a demodulator configured to demodulate the data signal to generate soft bit values, and a detection circuit. The detection circuit is configured to compute detection metrics for two or more subsets of the soft bit values, and detect inconsistent data in at least one subset of the soft bit values based on the detection metrics corresponding to the at least one subset.

In another embodiment, the receiving device comprises a receiving circuit configured to receive a data signal from a transmitting device, and a processing circuit. The processing circuit is configured to a demodulator configured to demodulate the data signal to generate soft bit values, compute detection metrics for two or more subsets of the soft bit values, and detect inconsistent data in at least one subset of the soft bit values based on the detection metrics corresponding to the at least one subset.

Another aspect of the disclosure comprises a computer program comprising executable instructions that, when executed by a processing circuit in a receiving device in a, causes the receiving device to perform any one of the methods described above.

Another aspect of the disclosure comprises a carrier containing a computer program as described in the preceding paragraph, wherein the carrier is one of an electronic signal, optical signal, radio signal, or computer readable storage medium.

Another aspect of the disclosure comprises anon-transitory computer-readable storage medium containing a computer program comprising executable instructions that, when executed by a processing circuit in a receiving device causes the receiving device to perform any one of the methods described above.

The methods and apparatus herein described enable a receiving device (e.g. UE or base station) to detect inconsistent or corrupted data. If an inconsistency or data corruption is detected, problems caused by the inconsistent data, such as combining the wrong data in the decoder, can be mitigated by taking certain measures based on the detected inconsistencies. The methods and apparatus will improve decoding performance and reduce the number of retransmissions, which in turn will improve spectral efficiency and system capacity.

DETAILED DESCRIPTION

For a better understanding of the invention and the related services an exemplary embodiment is described in the context of MBB and URLLC transmission. It will be appreciated however that the concepts herein described are more generically applicable to a first transmission over a set of physical resources spanning a limited time and frequency grid, being preempted by a second transmission using a sub set of the physical resource set. When a first data transmission is preempted, a subset of the resources allocated to the first data transmission are punctured or blanked to allow insertion of the second data signal. That is, the second data signal preempts resources allocated for the first data transmission.

Figure 1:
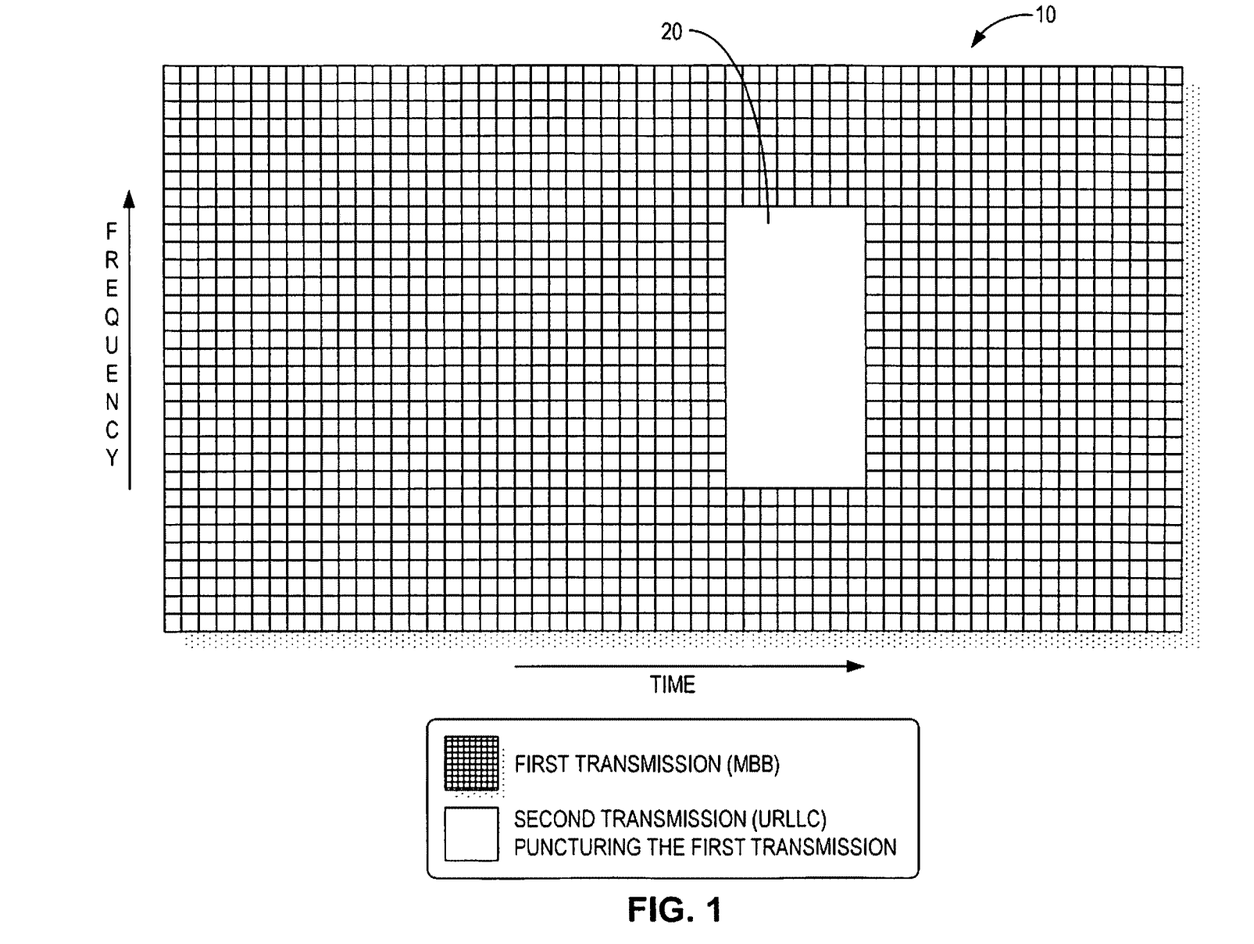
FIG. 1 illustrates an MBB transmission that has a contiguous region punctured to transmit URLLC data.
Figure 2:
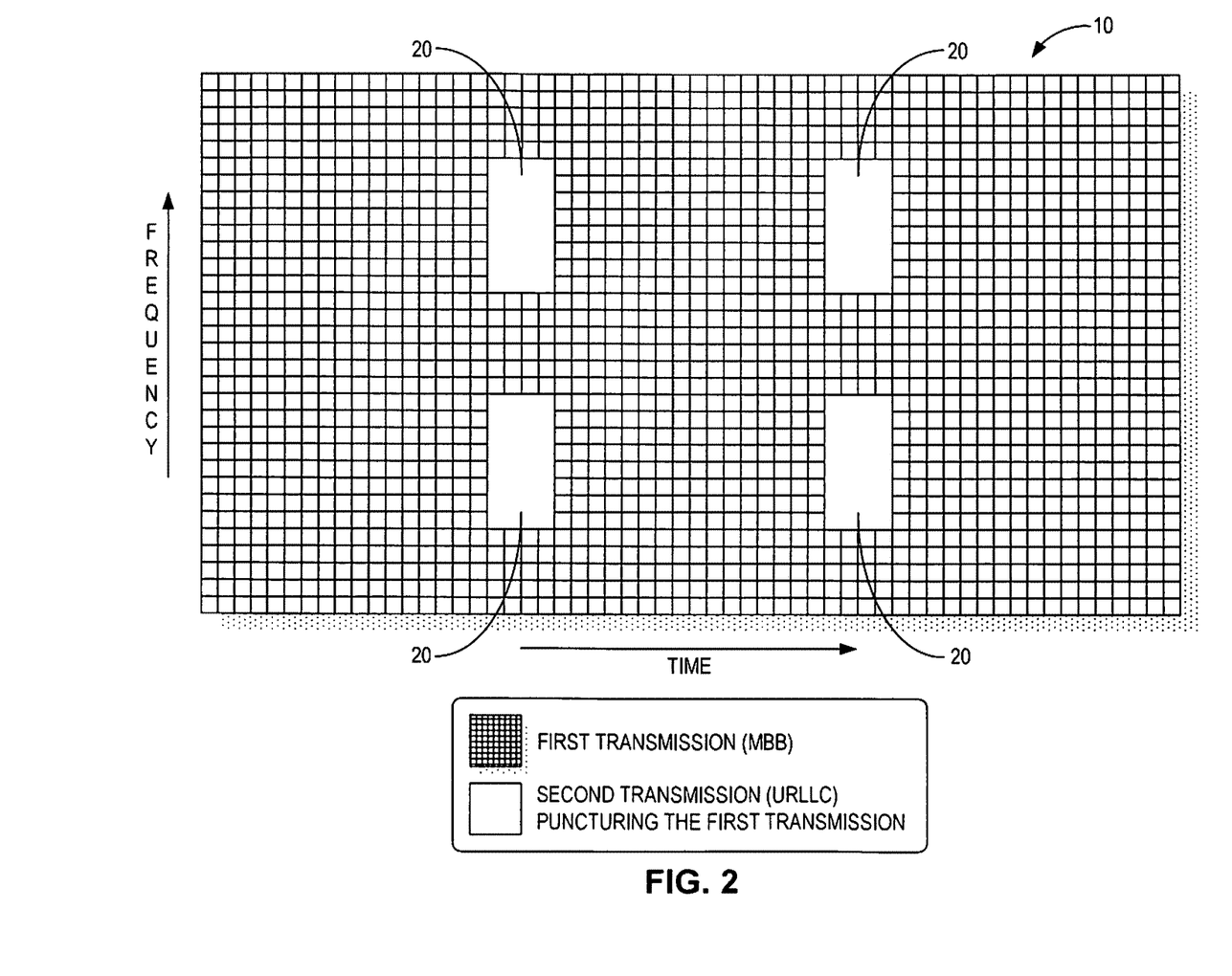
FIG. 2 illustrates an MBB transmission that has multiple punctured regions to transmit URLLC data.

FIGS. 1 and 2 illustrate exemplary puncturing patterns for preempting a first data transmission by a second data transmission. In FIG. 1, the MBB data transmission 10 is punctured by a single block 20 to transmit URLLC data. In FIG. 2, the MBB data transmission 10 is punctured by multiples blocks 20 to transmit URLLC data. When the MBB 10 is punctured to transmit URLLC data, the insertion of the URLLC data introduces inconsistencies in the characteristics of the received data signal that can be detected by the receiver.

Figure 3:
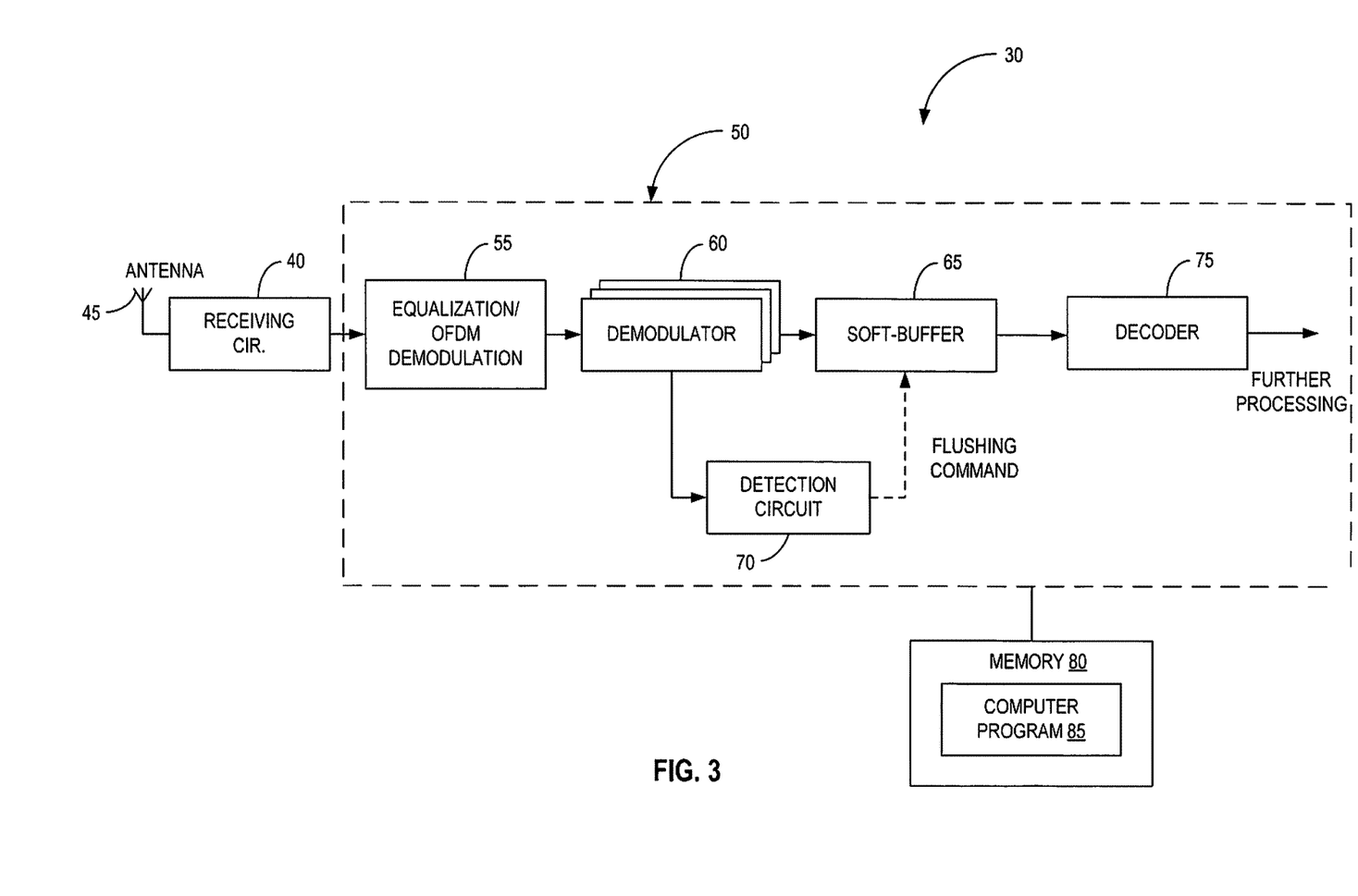
FIG. 3 illustrates an exemplary receiving device (e.g., base station or UE) according to an exemplary embodiment.

FIG. 3 shows an exemplary receiving device 30 configured to detect the data insertion based on inconsistencies in the characteristics of the received signal. The receiving device may comprises a base station, also referred to as an Evolved Node (eNB) or 5G NodeB (gNB) for uplink transmissions, or a user equipment (UE) for downlink transmissions. The receiving device 30 comprises a receiving circuit 40, a processing circuit 50, and memory 80.

The receiving circuit 40 comprises radio frequency circuitry coupled to an antenna or antennas 45 for receiving signals from a transmitting device (not shown). After analog-to-digital conversion, the processing circuit 50 processes the received signal as hereinafter described to detect inconsistencies in the characteristics of the received signal indicative of a data insertion or puncturing.

The processing circuit 50 processes the signals received by the receiving device 30 and controls the operation of the receiving device 30. The processing circuit 50 is configured to demodulate the data signal to generate soft bit values, compute detection metrics for two or more subsets of the soft bit values, and detect inconsistent data in at least one subset of the soft bit values based on the detection metrics corresponding to the at least one subset. The processing circuit 50 may comprise one or more microprocessors, hardware, firmware, or a combination thereof. A technical effect is that a data inconsistency can be detected in a more effective and specific manner. This provides the advantage that explicit signaling can be avoided and enables adaptive means to be applied depending on the type and extent of the inconsistency.

Memory 80 comprises a non-transitory computer readable medium that stores computer program code (85) and data need by the processing circuit 50 for operation. Memory 80 includes both volatile and non-volatile memory for storing computer program code and data needed by the processing circuit 50 for operation. Memory 80 may comprise any tangible, non-transitory computer-readable storage medium for storing data including electronic, magnetic, optical, electromagnetic, or semiconductor data storage. Memory 80 stores a computer program 85 comprising executable instructions that configure the processing circuit 50 to implement the methods and procedures described herein including methods shown in FIGS. 8 and 9. In general, computer program instructions and configuration information are stored in a non-volatile memory, such as a read only memory (ROM), erasable programmable read only memory (EPROM) or flash memory. Temporary data generated during operation may be stored in a volatile memory, such as a random access memory (RAM). In some embodiments, the computer program 85 for configuring the processing circuit 50 may be stored in a removable memory, such as a portable compact disc, portable digital video disc, or other removable media. The computer program 85 may also be embodied in a carrier such as an electronic signal, optical signal, radio signal, or computer readable storage medium.

In one embodiment, the processing circuit 50 comprises an equalization and Orthogonal Frequency Division Multiplexing (OFDM) demodulation circuit 55, a demodulator 60, a soft buffer 65, detection circuit 70, and decoder 75. The receiving circuit 40 converts the received signal to a digital baseband signal for input to the processing circuit 50. The equalization and OFDM demodulation circuit 55 equalizes the received signal and performs an Inverse Fast Fourier Transform (IFFT) to recover the modulation symbols. The demodulator 60, which is part of a bank of demodulators 60, de-maps/demodulates the modulation symbols to obtain bit qualities (e.g. LLRs). The receiving device 30 knows the allocated modulation scheme for the data transmission, which was established or provided by signaling procedures before the transmission. The demodulator 60 calculates bit qualities (LLRs) for each bit of information, which are input to the soft buffer 65 and detection circuit 70. The detection circuit 70 analyzes the set of bit qualities (LLRs) corresponded to one transmission to detect inconsistencies in statistical characteristics of the soft values. More advanced methods could be used, such as demodulation/de-mapping of the same signal by different (not only one) modulation schemes for statistical inconsistency analysis. If inconsistency is detected, the detection circuit 70 localizes the possibly corrupted data and takes measures to mitigate the potential impact of the data corruption. In one embodiment, the detection circuit 70 sends a flushing command to the soft buffer with indices of the corrupted bits and/or possibly corrupted bits. The soft-buffer 65 gets the flush command and sets the identified bit quality (LLR) values to the most neutral value (e.g. "0"). The resulting set of bit qualities (LLRs) is then passed along for further processing, e.g., by the decoder 75. Flushing the decoded bits improves decoding performance and reduces the number of retransmissions.

The detection circuit 70 processes the received data signals to blindly detect the preempting transmission. The approach described herein can be used in conjunction with other known methods to detect a preempting transmission. For instance, the receiving device 30 may receive a notification (e.g., a 1-bit NDI flag) from the network indicating when a first data transmission is preempted by a second data transmission. In this case, the method as herein described can be performed only when the notification is received. This approach avoids the need to process the data signal at all times to detect the inconsistent data and thus reduces the processing load, whilst still providing the advantage that explicit signaling to indicate in which time-frequency resources the preemption is occurring, for example, can be avoided. The notification may provide information to the receiving device to localize the data insertion to further reduce the amount of processing needed to detect the data insertion.

In one embodiment, the process for detecting the inconsistencies in the data signal is as follows.

Figures 4, 5:
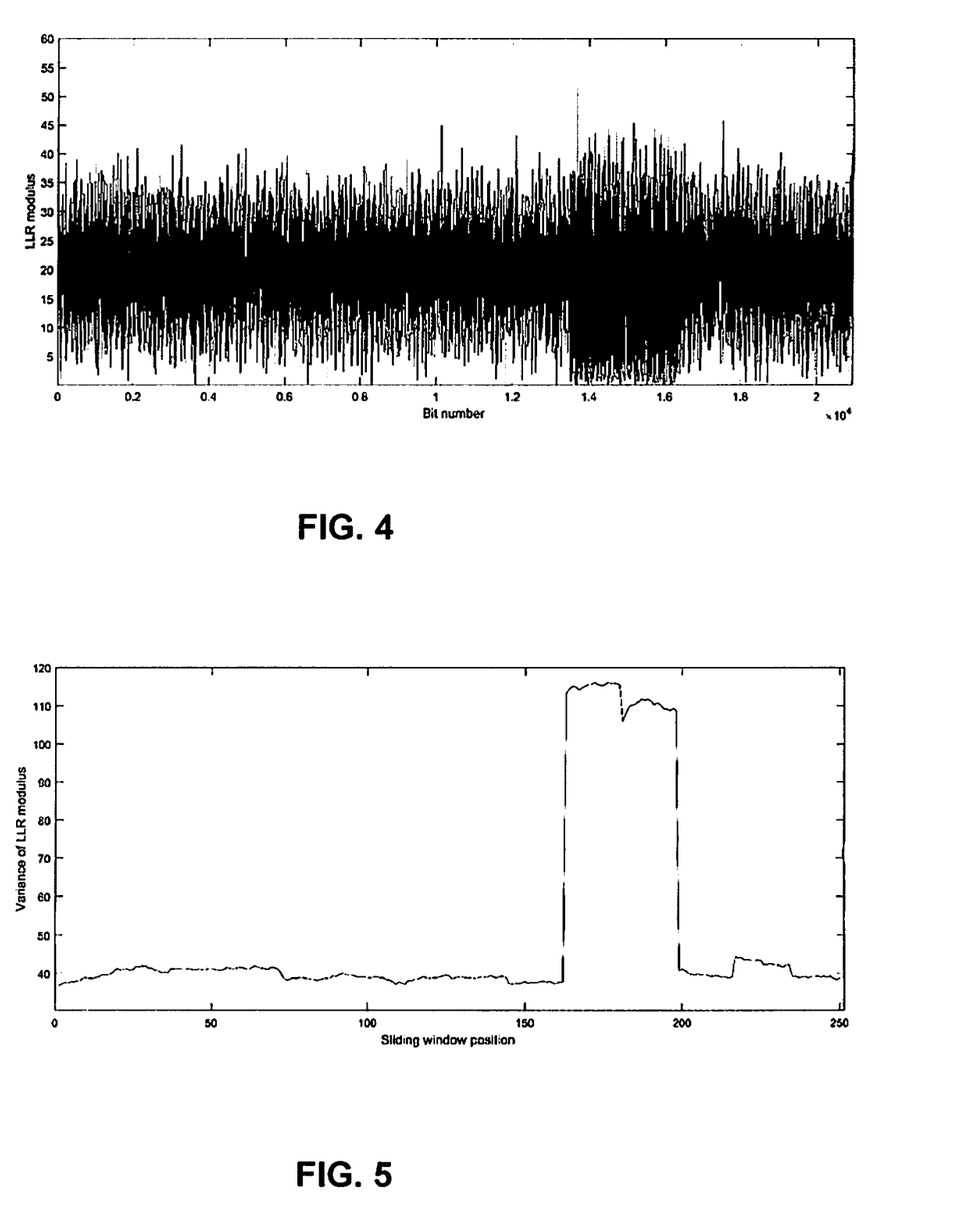
FIG. 4 illustrates soft bit values (LLRs) where a 16 QAM signal is inserted into a QPSK sign and de-mapped by a QPSK demodulator.
FIG. 5 illustrates variances of the LLR modules within a sliding window for the signal in FIG. 4.
Figure 6:
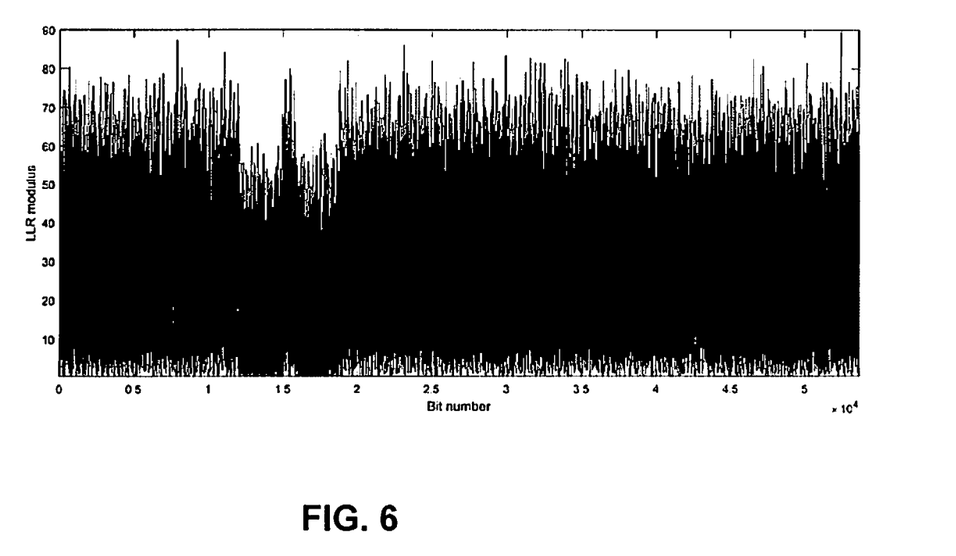
FIG. 6 illustrates soft bit values (LLRs) where a 16 QAM signal is inserted into a QPSK sign and de-mapped by a QPSK demodulator.

1. Define parameters of the algorithm: sliding window size, empirical "coefficient" value.
2. Receive bit qualities from demodulator/de-mapper. (See e.g., FIGS. 4 & 6).
3. For each position $i \in 0 \ldots (X-1)$ of the sliding window calculate a variance $x_i$ of bit qualities (LLRs) within the sliding window, where X is a number of possible positions of sliding window. A result of this step is a vector of length X.
4. Find the mean for the vector $x_i$ by $$\mu = \frac{\sum_{i=0}^{X-1} x_i}{X}$$

Figure 7:
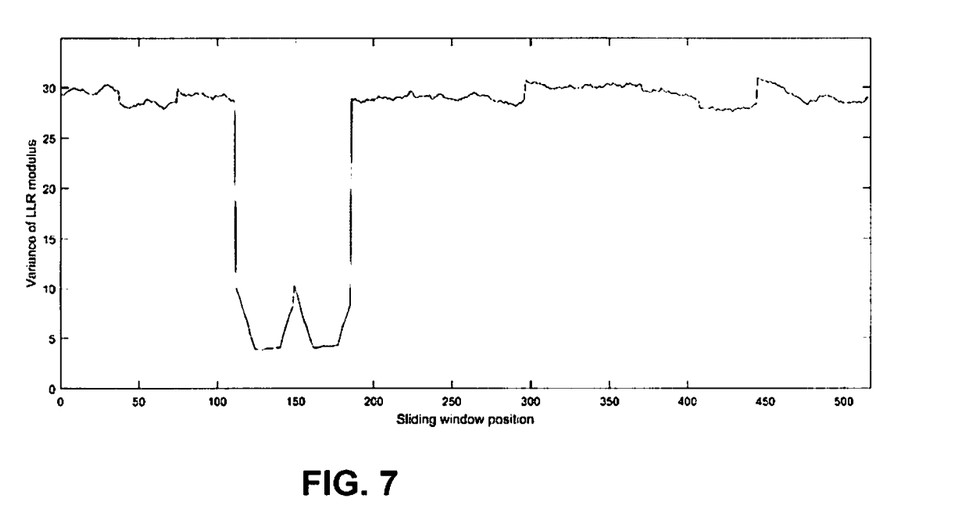
FIG. 7 illustrates variances of the LLR modules within a sliding window for the signal in FIG. 5.

5. Calculate value of dynamic thresholds. The coefficient value must be in an interval [0,1].
   a. Lower threshold=$\mu$·coefficient
   b. Upper threshold=$\mu$·(2−coefficient)
6. To determine which threshold will be used for detection, use the expression (Threshold lower−min($x$))<(max($x$)−Threshold upper)

a. If the expression is satisfied, use the upper threshold for detection:
      if max($x_i$)>Threshold upper, inconsistency is detected.
   b. Otherwise, use lower threshold for detection:
      If min($x_i$)<Lower threshold, inconsistency is detected.
7. If inconsistency is detected at 6a or 6b, then:
   a. Find extremums which are above (6a case, e.g., FIG. 5) or below (6b case, e.g., FIG. 7) the detection threshold.
   b. Find sliding window positions corresponded to the extremums $x_{begin}$ and $x_{end}$.
   c. Recalculate sliding window positions to obtain bit quality (LLRs) indices, which should be flushed, taking into account the size of the sliding window.
   d. Send the flushing command to the soft buffer with indices of the corrupted bits and/or possibly corrupted bits.
   e. If there is another corrupted region, repeat steps 7a-7e.
   f. If all corrupted regions are cleared, return to step 2 and the receiving device 30 waits for the next transmission.
8. If inconsistency is not detected by steps 6a or 6b, the process returns to step 2 and the receiving device 30 waits for the next transmission.

Figure 8:
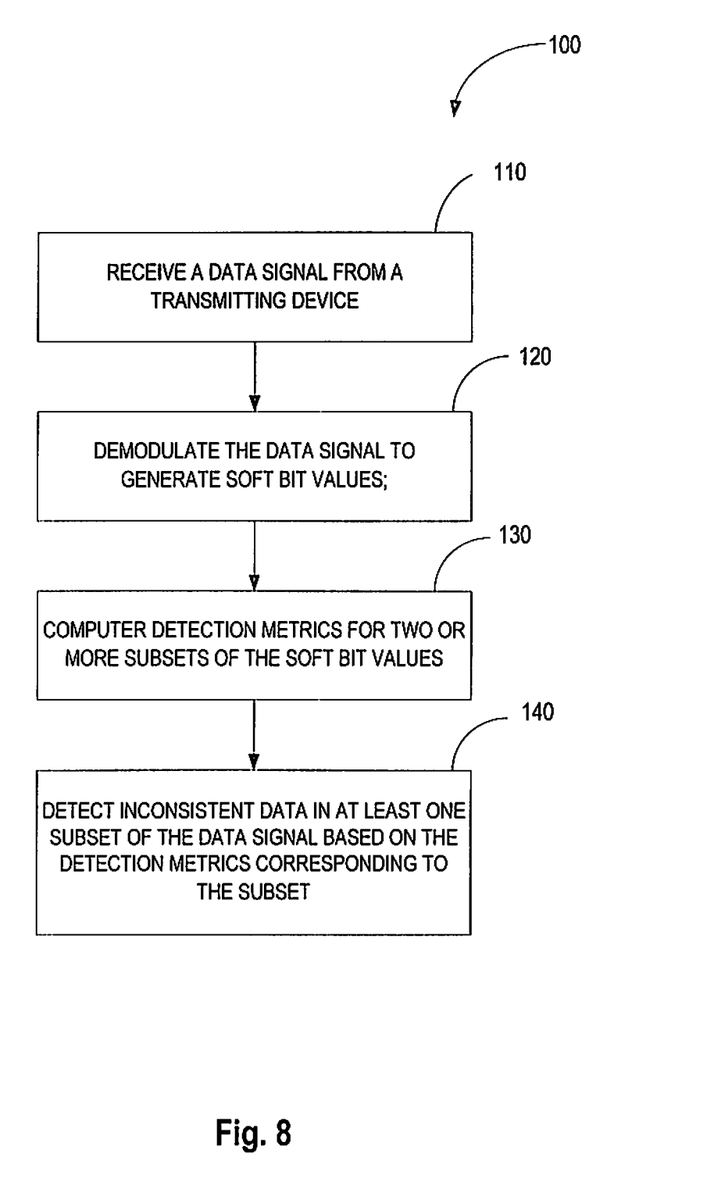
FIG. 8 illustrates an exemplary method implemented by a receiving device of detecting inconsistent data in a received data signal

FIG. 8 illustrates an exemplary method 100 implemented by a receiving device 30 according to one embodiment. The method 100 begins when the receiving device 30 receives a data signal from a transmitting device (block 110). The receiving device 30 demodulates the data signal to generate soft bit values (block 120). The receiving device 30 then computes detection metrics for two or more subsets of the soft bit values (block 130), and uses the detection metrics to detect inconsistent data in at least one subset of the data signal (block 140). In one embodiment, the receiving device 30 may use a sliding window to compute the detection metrics and perform the detection as described above.

The detection techniques are applicable for downlink transmissions e.g., gNB to a UE, in which case the UE performs the detection, as well as for uplink transmissions from a UE to a gNB, in which case the gNB performs the detection.

Sliding Window

The size of sliding window is a parameter that may be optimized. Any size could be used, but the detection process will obtain better performance when the size equals the minimum possible corruption region size. In each implementation, sliding window size is a value for optimization.

A computational complexity of the proposed algorithm could be decreased by specifying a step size for the sliding window moving. It is therefore possible to move the window with a step size more than 1 bit, hence, decreasing number of sliding window positions and decreasing number of calculations at step 3 of the detection process. In one embodiment, the step size may be equal to the window size so that the subsets of the soft bits processed by the detection circuit 70 do not overlap.

To be able to detect puncturing transmissions that are spanning more than one symbol in time, the sliding window may have a two-dimensional extent, in both time and frequency. This two-dimensional sliding window can preferably be combined by the step sizes above, to search for predefined puncturing sizes in time and frequency direction.

Empirical Coefficient

The empirical coefficient, denoted as coefficient in the above description, is used to tune the detection circuit 70 for different radio conditions where the variance of bit quality modulus may vary from values very close to zero to values larger than 10. This is the one reason why absolute threshold should not be used for detection. For compensation of drifting effect, a dynamic threshold may be used. The use of both lower and upper thresholds is to enable the receiving device to detect different modulation inconsistency patterns (cf., FIGS. 5 and 7). According to the expressions at step 5 of the detection process, the empirical coefficient is always used for offsetting the mean variance value. In other words, the empirical coefficient defines how far the variance within the sliding window should be from mean expected variance value to consider this as an inconsistency. The empirical coefficient may be empirically established based on simulations to provide the best performance.

Detecting Based on Constituent Parts of Inserted Signal

A puncturing transmission is expected to contain at least three different constituent parts:

1. A control part, e.g., Physical Downlink Control Channel (PDCCH). Modulation is fixed (QPSK). Expected in first symbol of puncturing transmission.
2. A reference signal part, e.g., Demodulation Reference Signals (DMRS). Modulation is fixed (QPSK), DMRS sequence is known. Position relative puncturing transmission start should be configured and known.
3. A data part, e.g., Physical Downlink Shared Channel (PDSCH) or Physical Uplink Shared Channel (PUSCH). Different modulations expected.

As a baseline, the detection circuit 70 examines the data part of the inserted signal to detect differences. In the case where the modulation is the same in puncturing and punctured transmissions, the other constituent parts of the puncturing transmission may be useful. In one embodiment, the detection circuit 70 searches for the presence of a one-OFDM symbol long QPSK transmission to tag the start of the puncturing transmission. With knowledge of the configurable mini-slot duration, the punctured symbols can be tagged if the MBB modulation is different.

In another embodiment, the detection circuit 70 searches for a known QPSK sequence (as one example a Zadoff-Chu sequence) corresponding to DMRS. If the position of DMRS in the mini-slot and the mini-slot duration is known, the punctured symbols can be tagged. In one embodiment, the QPSK sequence to be used for puncturing transmission is pre-defined, allowing any MBB UE to easily distinguish the extents of punctured resources. Normally, the sequence is UE-specific, which would make it hard for the MBB UE to descramble it. The QPSK sequence for puncturing transmission DMRS could also be specified in a non-constant way, dependent on cell identity, subframe number etc., but preferably not UE-specific.

Alternatives

Methods for detecting modulation inconsistencies can be based on different states of the received data. For example, the detection can be based on a set of received symbols or soft values after demodulation. Based on the sliding window approach described above, alternative methods of detection may be used, including for example using average Euclidian distance among symbols in the received data to detect modulation inconsistencies, or comparing the soft values with the expected value of the known underlying modulation scheme. Different methods may perform well in different radio conditions. The method proposed based on a variance of the LLR modulus provides good performance with reasonable complexity.

Applications

The detection techniques may be applied for detection of the puncturing region in Long Term Evolution (LTE) or Next Radio (NR) communication systems. In one embodiment, puncturing as described herein implies that the eNb/gNb replaces some of the resources previously scheduled for the UE with URLLC resources targeted to the same UE or another UE.

Also, the detection techniques can be used on a transmission that is subjected to time/frequency limited interference, i.e., the interference is occurring over limited regions in time and frequency. By detecting where the interference has occurred, it can be removed from the transmission in the same way as done for puncturing.

When subjected to interference, which can come from the same eNb/gNb or a different eNb/gNb, or another communication system, or any other form of interference, there may be parts of the original transmission still existing in the reception (although with a lower signal-to-interference plus noise ratio (SINR)). By estimating the SINR level, some parts of the soft values may be kept instead of being completely removed. That is, rather than discarding or removing soft values, the soft values may be modified by a down-scaling the soft values, which will give them less importance in the soft combining.

FIG. 8 illustrates an exemplary method 100 implemented by a receiving device 30 according to one aspect of the disclosure. The method 100 begins when the receiving device 30 receives a data signal from a transmitting device (block 110). The receiving device 30 demodulates the data signal to generate soft bit values (block 120). The receiving device 30 then computes detection metrics for two or more subsets of the soft bit values (block 130), and uses the detection metrics to detect inconsistent data in at least one subset of the data signal (block 140). In one embodiment, the receiving device 30 may use a sliding window to compute the detection metrics and perform the detection as described above.

Figure 9:
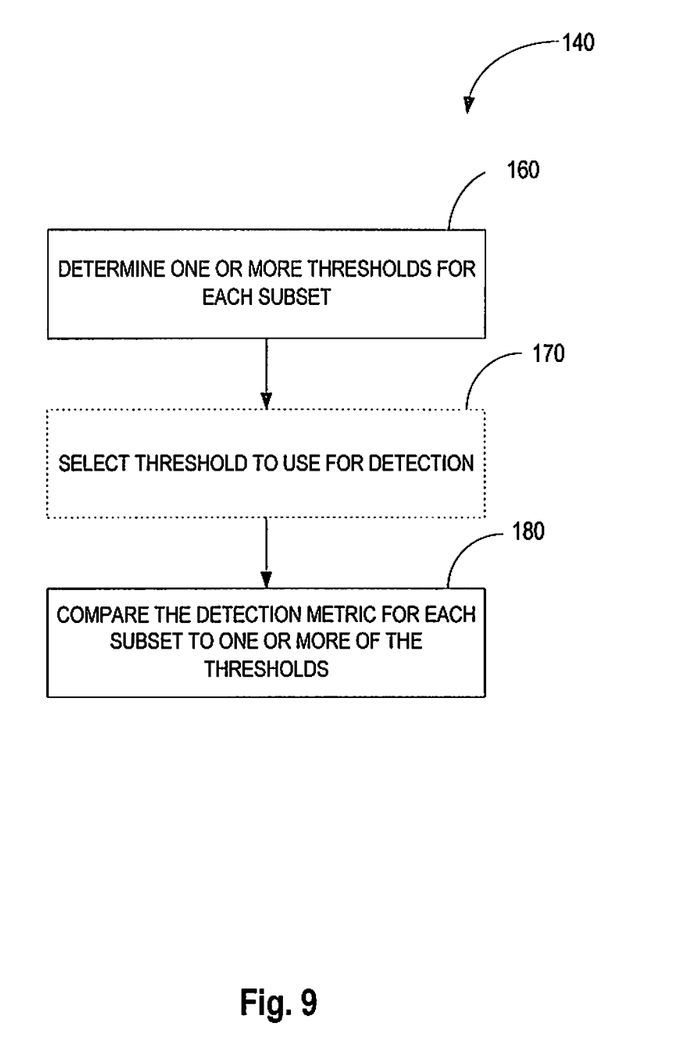
FIG. 9 illustrates additional aspects of the method of detecting inconsistent data in a received data signal.

FIG. 9 illustrates an exemplary method of detecting inconsistent data in a data signal, which can be performed at block 140 in FIG. 8. The receiving device 30 determines one or more thresholds for each subset (block 160). In some embodiment, the threshold or thresholds for each subset are computed separately. In some embodiments, the same threshold or set of thresholds is used for all subsets or for a group of subsets. To detect the inconsistent data, the receiving device 30 compares the detection metric for each subset to one or more of the thresholds determined in block 160 (block 180). In embodiments where multiple thresholds (e.g. an upper threshold and a lower threshold) are used, the receiving device 30 may optionally select a threshold to apply to the detection of the inconsistent data (block 170).

In some embodiments of method 100, computing the detection metrics for two or more subsets of the soft bit values comprises computing the detection metric based on a statistical property of the soft bit values within each subset.

In some cases, the receiving device dynamically determines the threshold for each subset based on the detection metrics in the subset.

In some embodiments of the method 100, detecting inconsistent data in the at least one subset of the soft bit values comprises comparing the detection metric to expected values of a known modulation scheme for the data signal.

In some embodiments of the method 100, detecting inconsistent data in the at least one subset of the soft bit values comprises comparing the detection metrics with a known sequence in the inconsistent data.

In some embodiments of the method 100, the known sequence comprises one of a known tag in the inconsistent data, or a known reference signal sequence.

In some embodiments of the method 100, detecting inconsistent data in the at least one subset of the soft bit values comprises comparing the detection metric with a known modulation for the inconsistent data.

In some embodiments of the method 100, detecting inconsistent data in the at least one subset of the soft bit values based on the detection metrics comprises comparing the detection metric to a threshold.

Some embodiments of the method 100 further comprise dynamically determining the threshold for each subset based on the detection metrics in the subset.

In some embodiments of the method 100, dynamically determining the threshold for each subset based on the detection metrics in the subset further comprises computing one or more thresholds for each subset of soft bit values, and selecting one of determined thresholds to use for detecting an inconsistency in the subset of soft bit values.

In some embodiments of the method 100, computing detection metrics for two or more subsets of the soft bit values comprises computing variances of soft bit values within each subset.

Some embodiments of the method 100 further comprise detecting the inconsistent data in the at least one subset of the soft bit values based on the detection metrics corresponding to the subset comprises comparing the variances of the soft bit values in the subset to a threshold.

In some embodiments of the method 100 further comprise dynamically determining the threshold for each subset based on the computed variance in the subset.

In some embodiments of the method 100, dynamically determining the threshold for each subset soft bit values based on the detection metrics in the subset comprises determining a mean of the variances, and computing the threshold as a function of the mean of the variances.

In some embodiments of the method 100, dynamically determining the threshold for each subset soft bit values based on the detection metrics in the subset further comprises computing, as a function of the mean of the variances, one or more thresholds for each subset of soft bit values, and selecting one of the determined thresholds to use for detecting an inconsistency in the subset of soft bit values.

Some embodiments of the method 100 further comprise, responsive to detection of inconsistent data, identifying one or more soft bits values corresponding to the inconsistent data and modifying the soft bit values corresponding to the inconsistent data to reduce decoding errors.

In some embodiments of the method 100, modifying the soft bit values corresponding to the inconsistent data to reduce decoding errors comprises setting the soft bit values to zero.

The various aspects of the method 100 described above may be used in combination where the aspects are not otherwise inconsistent or incompatible.

Figure 10:
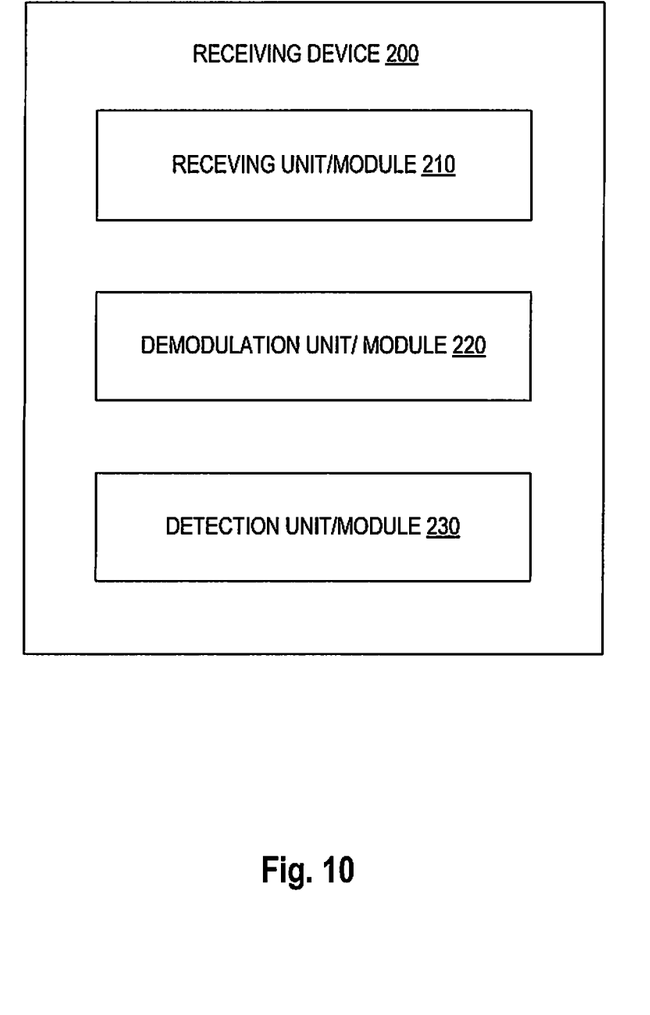
FIG. 10 illustrates an exemplary receiving device according to another embodiment.

FIG. 10 illustrates another exemplary receiving device 200 configured to perform the methods shown in FIGS. 8 and 9. The receiving device 200 comprises a receiving unit/module 210, a demodulation unit/module 220, and a detection unit/module 230. The various units/modules can be implemented by hardware circuits, processing circuits and/or software. The receiving unit/module 210 is configured to receive a data signal from a transmitting device. The demodulation unit/module 220 is configured to demodulate the data signal to generate soft bit values. The detection circuit 70 is configured to compute detection metrics for two or more subsets of the soft bit values, and to detect inconsistent data in at least one subset of the soft bit values based on the detection metrics corresponding to the at least one subset.

Note that the apparatus described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

The methods and apparatus herein described enable a receiving device (e.g. UE or base station) to detect inconsistent or corrupted data. If an inconsistency or data corruption is detected, measures can be taken to mitigate potential problems caused by the inconsistent data. Problems such as combining the wrong data in the decoder may be avoided for example. The methods and apparatus will improve decoding performance and reduce the number of retransmissions, which in turn will improve spectral efficiency and system capacity.

What is claimed is:

1. A method of detecting inconsistent data in a received signal affected by a data insertion where first symbols in a first signal are preempted and replaced by second symbols of a second signal, the method comprising:
    receiving an Orthogonal Frequency Division Multiplexing (OFDM) signal from a transmitting device;
    performing OFDM demodulation on the received OFDM signal to recover modulation symbols corresponding to a received symbol sequence, wherein the received symbol sequence includes first symbols of the first signal and inconsistent data comprising second symbols of the second signal replacing a subset of the first symbols that have been preempted by the data insertion;
    demodulating the modulation symbols to generate soft bit values for the modulation symbols of the received symbol sequence;
    computing a detection metric for each of two or more different subsets of the soft bit values for the received symbol sequence; and
    detecting the inconsistent data in the received symbol sequence based on the detection metrics.

2. The method of claim 1, wherein the computing detection metrics comprises computing the detection metrics based on a statistical property of the soft bit values within each subset.

3. The method of claim 2, wherein the detecting inconsistent data in the at least one subset of the soft bit values comprises:
    comparing the detection metrics to expected values of a known modulation scheme for the modulation symbols;
    comparing the detection metrics with a known sequence in the inconsistent data; and/or
    comparing the detection metrics with a known modulation for the inconsistent data.

4. The method of claim 1, wherein the detecting inconsistent data comprises comparing the detection metrics to a threshold.

5. The method of claim 4, further comprising dynamically determining the threshold for each subset based on the detection metrics in the subset.

6. The method of claim 5, wherein the dynamically determining the threshold for each subset comprises:
    computing one or more thresholds for each subset of soft bit values; and
    selecting one of determined thresholds to use for detecting an inconsistency in the subset of soft bit values.

7. The method of claim 1, wherein the computing detection metrics for two or more subsets of the soft bit values comprises:
    processing the modulation symbols in a sliding window detector; and
    for each of two or more different sliding window positions, computing detection metrics for the soft bit values contained within the sliding window.

8. The method of claim 1, further comprising:
    responsive to detection of inconsistent data, identifying one or more soft bits values corresponding to the inconsistent data; and
    modifying the soft bit values corresponding to the inconsistent data to reduce decoding errors.

9. The method of claim 8, wherein the modifying the soft bit values corresponding to the inconsistent data comprises setting the soft bit values to zero.

10. A receiving device configured to detect inconsistent data in a received signal affected by a data insertion where first symbols in a first signal are preempted and replaced by second symbols of a second signal, the receiving device comprising:
 a receiving circuit configured to receive an Orthogonal Frequency Division Multiplexing (OFDM) signal from a transmitting device;
 an OFDM demodulator configured to demodulate the received OFDM signal to recover modulation symbols corresponding to a received symbol sequence, wherein the received symbol sequence includes inconsistent data comprising second symbols of the second signal replacing a subset of the first symbols that have been preempted by the data insertion;
 a demodulator configured to demodulate the modulation symbols from the OFDM demodulator to generate soft bit values for the modulation symbols of the received symbol sequence; and
 a detection circuit configured to:
  compute detection metrics for each of two or more different subsets of the soft bit values for the received symbol sequence; and
  detect the inconsistent data in the received symbol sequence based on the detection metrics.

11. The receiving device of claim 10, wherein the detection circuit is configured to compute the detection metrics based on a statistical property of the soft bit values within each subset.

12. The receiving device of claim 11, wherein the detection circuit is configured to compare the detection metrics to expected values of a known modulation scheme for the modulation symbols.

13. The receiving device of claim 11, wherein the detection circuit is configured to compare the detection metrics with a known sequence in the inconsistent data.

14. The receiving device of claim 13, wherein the known sequence comprises a known tag in the inconsistent data and/or a known reference signal sequence.

15. The receiving device of claim 11, wherein the detection circuit is further configured to compare the detection metrics with a known modulation for the inconsistent data.

16. The receiving device of claim 10, wherein the detection circuit is configured to compare the detection metric to a threshold.

17. The receiving device of claim 16, wherein the detection circuit is configured to dynamically determine the threshold for each subset of soft bit values based on the detection metrics in the subset.

18. The receiving device of claim 17, wherein the detection circuit is configured to dynamically determine the threshold for each subset of soft bit values by:
 computing one or more thresholds for each subset of soft bit values; and
 selecting one of determined thresholds to use for detecting an inconsistency in the subset of soft bit values.

19. The receiving device of claim 10, wherein the detection circuit is configured to compute detection metrics as variances of soft bit values within each subset.

20. The receiving device of claim 19, wherein the detection circuit is configured to compare the variances of the soft bit values in the subset to a threshold.

21. The receiving device of claim 20, wherein the detection circuit is configured to dynamically determine the threshold for each subset of soft bit values based on the detection metrics in the subset.

22. The receiving device of claim 21, wherein the detection circuit is configured to dynamically determine the threshold for each subset of soft bit values by:
 determining a mean of the variances of the subset of soft bit values; and
 computing the threshold as a function of the mean of the variances.

23. The receiving device of claim 22, wherein the detection circuit is configured to dynamically determine the threshold for each subset of soft bit values:
 computing, as a function of the mean of the variances, one or more thresholds for each subset of soft bit values; and
 selecting one of the determined thresholds to use for detecting an inconsistency in the subset of soft bit values.

24. The receiving device of claim 10, wherein the detection circuit is configured to compute detection metrics for two or more subsets of the soft bit values by:
 processing the modulation symbols in a sliding window detector; and
 for each of two or more different sliding window positions, computing detection metrics for the soft bit values contained within the sliding window.

25. The receiving device of claim 10, wherein the detection circuit is configured to:
 responsive to detection of inconsistent data, identify one or more soft bits values corresponding to the inconsistent data; and
 modify the soft bit values corresponding to the inconsistent data to reduce decoding errors.

26. The receiving device of claim 25, wherein the detection circuit is configured to modifying the soft bit values corresponding to the inconsistent data by setting the soft bit values to zero.

* * * * *